United States Patent [19]

Grace, Sr.

[11] Patent Number: 5,111,963
[45] Date of Patent: May 12, 1992

[54] CONTAINER STORAGE AND DISPENSING APPARATUS

[75] Inventor: Robert W. Grace, Sr., Fort Lauderdale, Fla.

[73] Assignee: Frederick J. Stingel, Lake Park, Fla.

[21] Appl. No.: 705,512

[22] Filed: May 24, 1991

[51] Int. Cl.⁵ .................. G07F 11/06; G07F 11/08
[52] U.S. Cl. .................................. 221/75; 221/108; 193/27; 414/276; 312/42
[58] Field of Search .............. 221/75, 22, 311, 204, 221/205, 107, 108, 109; 193/27, 28, 35 R, 38, 40; 414/267, 276, 285; 312/42

[56] References Cited

U.S. PATENT DOCUMENTS

| | | | |
|---|---|---|---|
| 296,600 | 4/1884 | Norwood | 414/276 |
| 342,433 | 5/1886 | Fischer . | |
| 409,806 | 8/1889 | Schureman | 193/27 |
| 1,034,618 | 8/1912 | Holcombe | 193/27 |
| 2,701,077 | 6/1952 | Palmer | 221/75 |
| 3,437,235 | 10/1967 | Guerra | 221/75 |
| 3,477,560 | 11/1969 | Broser | 221/75 |
| 3,608,776 | 9/1971 | Moe et al. | 221/90 |
| 4,273,253 | 6/1981 | Tanaka et al. | 221/75 |
| 4,485,910 | 12/1984 | Tabler | 414/286 X |
| 4,621,745 | 11/1986 | Grace | 221/75 |

FOREIGN PATENT DOCUMENTS

| | | |
|---|---|---|
| 453068 | 11/1927 | Fed. Rep. of Germany . |
| 1045134 | 11/1958 | Fed. Rep. of Germany . |
| 1144186 | 2/1963 | Fed. Rep. of Germany . |
| 52-1862 | 1/1977 | Japan . |
| 54-38075 | 3/1979 | Japan . |
| 521191 | 9/1976 | U.S.S.R. . |
| 1044183 | 9/1966 | United Kingdom . |
| 1414022 | 11/1975 | United Kingdom . |
| 2047666 | 12/1980 | United Kingdom . |

OTHER PUBLICATIONS

Allan Harvey, "Automatic Routing and Dispatching to Trucks and Trailers", Flow Magazine, May 1956, pp. 110 and 142.
Ordermatic Bulletin No. 376 "A Guide to Automated Order Selection Systems".
Autoque Brochure-Cybernated Automation Corporation.

Primary Examiner—Robert P. Olszewski
Assistant Examiner—Dean A. Reichard
Attorney, Agent, or Firm—Eckert Seamans Cherin & Mellott

[57] ABSTRACT

A storage and dispensing apparatus for articles, containers and the like includes two opposing vertical stacks of shelf assemblies pivotally mounted relative to support structure for rotation between an upwardly tilted receiving and storage position in a downwardly tilted discharge position. Each shelf assembly includes a transfer stop and transfer control for retaining the shelf assembly in the receiving position until the next lower shelf assembly is prepared to receive a container. Each shelf assembly can also include a receiving stop for retaining the shelf assembly in the receiving position until a container is fully disposed on the shelf surface. The shelf assembly can further include a discharge drive for overcoming static between a stored container and the underlying shelf surface during transfer operations. The apparatus automatically advances container downwardly through the stack to the lowest unfilled shelf for selective dispensing at the bottom of the stacks.

29 Claims, 4 Drawing Sheets

5,111,963

CONTAINER STORAGE AND DISPENSING APPARATUS

FIELD OF THE INVENTION

The invention relates to automated storage and dispensing systems for containers, articles and the like. More particularly, the invention relates to apparatus for storing containers and automatically advancing the containers in the storing apparatus as a container is dispensed from the apparatus.

BACKGROUND OF THE INVENTION

Systems for automating the storage and distribution of containerized goods in warehousing and manufacturing facilities have been developed to reduce the expense and errors associated with manual storage and distribution. Automated storage and distribution systems, such as that described in U.S. Pat. No. 4,621,745, can improve warehouse and manufacturing operation efficiency and inventory management.

U.S. Pat. No. 4,621,745 discloses a container storage and dispensing assembly for use in an automated storage and distribution system. The assembly includes two opposing stacks of vertically staggered shelf assemblies. The shelf assemblies receive containers at the top of the stacks and distribute the containers in zigzag fashion downward through the stacks to a dispensing location at the bottom of the stacks.

Each shelf assembly is mounted relative to a support structure to pivot between an upwardly tilted receiving position, a substantially horizontal storage position, and a downwardly tilted discharge position. In operation, a shelf assembly in the upwardly tilted receiving position receives a container from a next higher shelf assembly that is in the downwardly tilted discharge position. The receiving shelf assembly pivots downwardly under the weight of the container and locks in the horizontal storage position if the next lower shelf assembly is not in the receiving position.

The next lower shelf assembly assumes the receiving position when it is empty. The upper shelf assembly is unlocked from the storage position by the upward movement of the next lower shelf assembly, and is thereby permitted to pivot downwardly to the discharge position to transfer the container to the next lower shelf assembly. In this manner, the containers move downwardly through the stacks in sequential fashion until the lowermost shelf assemblies are filled with containers, and advance sequentially as containers are dispensed from the bottom of the stacks.

During operation, a transferred container can topple or lodge between shelf assemblies if the receiving shelf assembly is not prevented from pivoting downwardly from the receiving position before the container is completely disposed on the receiving shelf surface. Accordingly, the descent of the receiving shelf assembly should be delayed until the container is fully received.

Static friction between a stored container and the underlying shelf surface can sometimes prevent the container from sliding off the shelf assembly during a discharge operation. The friction can be offset by increasing the downward angle of the downwardly tilted discharge position to provide a steeper discharge slope. However, increasing the discharge tilt angle reduces the quantity of shelf assemblies that can be arranged in a stack of specified height. It would be desirable to overcome this friction without increasing the discharge tilt angle of the shelf assembly.

SUMMARY OF THE INVENTION

It is an object of the invention to provide an improved shelf assembly for an automated container storage and dispensing system.

It is another object of the invention to provide a shelf assembly adapted for smooth motion to reduce wear of the components of an automated container storage and dispensing system.

It is yet another object of the invention to prevent premature downward rotation of a shelf assembly in an automated container storage and dispensing system.

It is a further object of the invention to reduce the downward discharge tilt angle required to overcome static friction between a stored container and the underlying shelf surface in an automated container storage and dispensing system.

These and other objects of the invention are achieved by storage and dispensing apparatus for articles, containers and the like. The apparatus has two opposing, substantially vertical stacks of shelf assemblies mounted on support structure, such as walls, columns or a free-standing tower. Each shelf assembly includes a shelf for receiving, storing and discharging containers, and the shelves of the opposing stacks are vertically staggered relative to one another.

Each shelf is pivotally mounted relative to the support structure for rotation between an upwardly tilted receiving position and a downwardly tilted discharge position. The free ends of the shelves of each stack extend toward the free ends of the shelves of the opposing stack. A shelf in the downwardly tilted discharge position is positioned relative to a next lower, opposing shelf in the upwardly tilted receiving position to permit the sliding transfer of a container under the influence of gravity from the upper shelf to the next lower, opposing shelf.

Containers are introduced to the shelf assemblies at or near the top of the stacks and are transferred downwardly from one shelf to the next in zigzag manner. Each container descends through the stacks until it is disposed on the lowest unfilled shelf. Containers can be selectively dispensed from a dispensing position at the bottom of the stacks.

Each shelf assembly includes biasing means or structure, such as an axial spring, for urging the shelf to the receiving position. The biasing means is adapted, however, to allow the shelf to pivot to the discharge position under the weight of a container disposed on the shelf.

Each shelf assembly also includes transfer stop means, moveable between a lock position and a release position. The transfer stop means in the lock position is adapted to retain the shelf in the receiving position when the next lower, opposing shelf is occupied by a container or is not in the receiving position. A transfer control means, which can be mechanical, electrical or pneumatic, controls the position of the transfer stop means and is adapted to move the transfer stop means between the lock and release positions according to readiness of the next lower, opposing shelf assembly to receive a container.

The shelf assembly can also include a receiving stop means for retaining the shelf in the receiving position until a container transferred from the next higher shelf assembly is fully received by the shelf. The receiving stop means prevents the shelf from descending prematurely, which can cause the container to topple or lodge between shelves.

When both the transfer stop means and the receiving stop means are provided in the shelf assembly, the shelf is retained in the receiving position until the receiving stop means and the transfer stop means are simultaneously configured to allow the shelf to pivot downwardly. If either the receiving stop means or the transfer stop means are positioned to retain the shelf in the receiving position, the shelf cannot descend to the discharge position. Thus, the shelf assembly can prevent premature descent of the shelf before a container is fully received and can also prevent the transfer of a container to a next lower shelf that is occupied by a container or is not in the receiving position.

The transfer stop means and the receiving stop means are preferably embodied in a pivot plate and an indicator arm. The plate provides two slots for receiving pins operatively connected to the shelf. A transfer stop pin is secured by the plate until the plate is moved by the transfer control means when the next lower shelf assembly is ready to receive a container. A second receiving stop pin is secured by the plate until the indicator arm is moved by the presence of a container on the shelf surface. Thus, the preferred embodiment combines the transfer stop means and receiving stop means in a single plate with pin engaging slots.

A discharge drive means for overcoming static friction between a stored container and the underlying shelf surface can also be provided. This friction can impede or prevent the container from sliding off the shelf. In a presently preferred embodiment, the discharge drive means is pivotally connected to the shelf and biased forward by the action of the biasing means to urge the container toward the free end of the shelf. The action of the discharge drive means combines with the downward tilting of the discharge position to urge the container off the shelf and onto the next lower shelf.

The storage and dispensing apparatus of the invention includes only an upwardly tilted receiving and storage position and a downwardly tilted discharge position. The number of operational steps required to receive, store and dispense a container are thereby reduced. The two position shelf assembly can improve the smoothness of motion, and can thereby reduce wear of the component parts of the assembly and damage to goods being transferred through the apparatus. Further, the useful life of the assembly components can be extended, and the off-line time for system repairs can be reduced.

BRIEF DESCRIPTION OF THE DRAWINGS

There are shown in the drawings, embodiments which are presently preferred; it being understood, however, that the invention is not limited to the present arrangements and instrumentalities shown, wherein.

DETAILED DESCRIPTION OF THE PREFERRED EMBODIMENTS

General Arrangement

Figure 1:
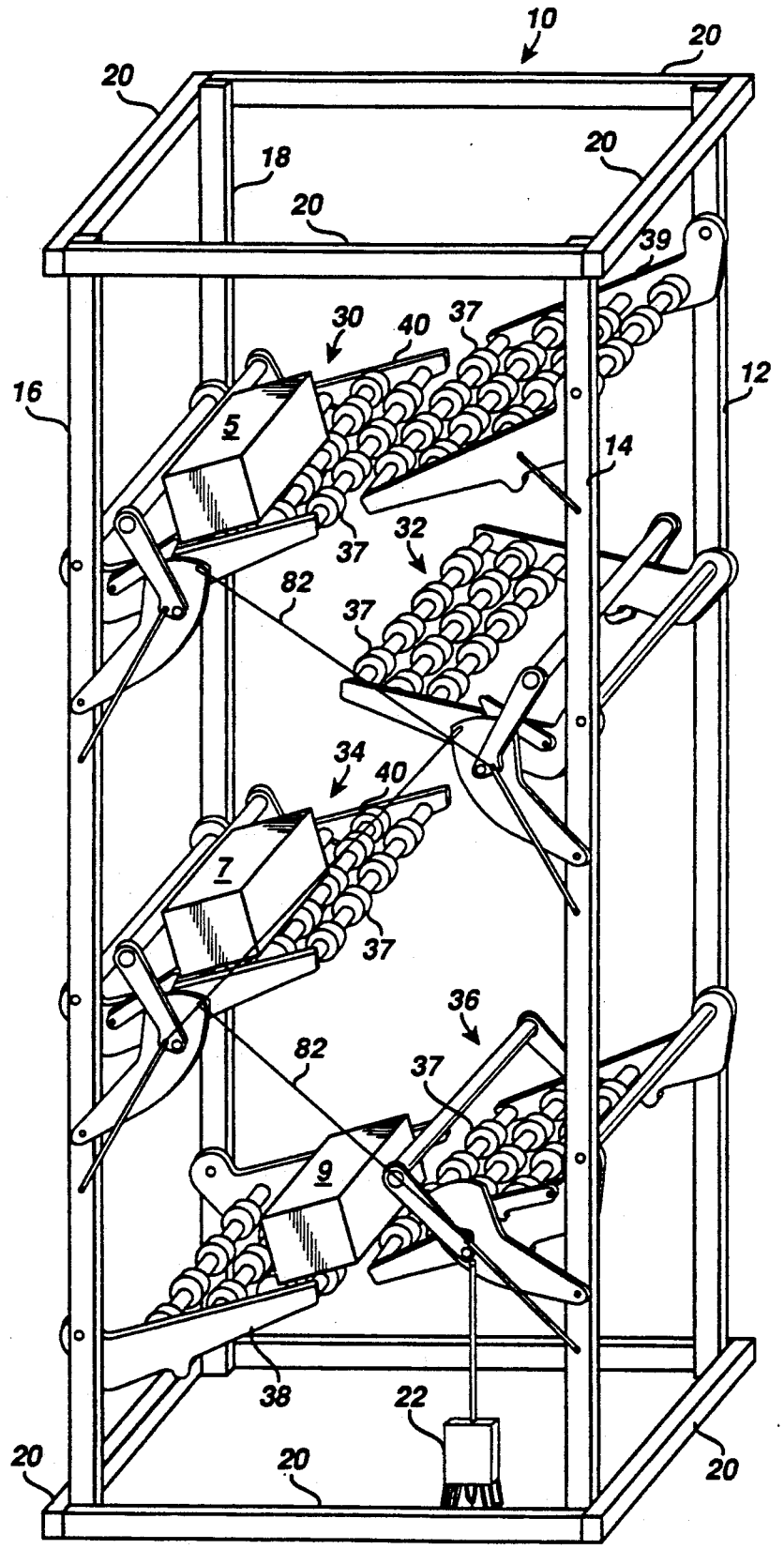
FIG. 1 is a perspective view of a container storage and dispensing apparatus according to the invention.

The invention relates to apparatus for vertically storing and dispensing containers, cartons, articles or the like. The apparatus can have many applications, including storing containerized goods in warehousing facilities and storing parts in manufacturing facilities.

Referring to FIGS. 1-4, the container storage and dispensing apparatus includes two opposing, substantially vertical stacks of shelf assemblies 30, 32, 34 and 36 mounted on support structure. The stacks can consist of a large number of shelf assemblies, perhaps sixty, but for purposes of illustration and explanation, shelf assemblies 30, 32, 34, and 36 are shown in the drawings. The support structure can be walls or the like, but is preferably a framework, such as a free standing tower 10, which has vertical columns 12, 14, 16 and 18, laterally supported by cross members 20.

Figure 3:
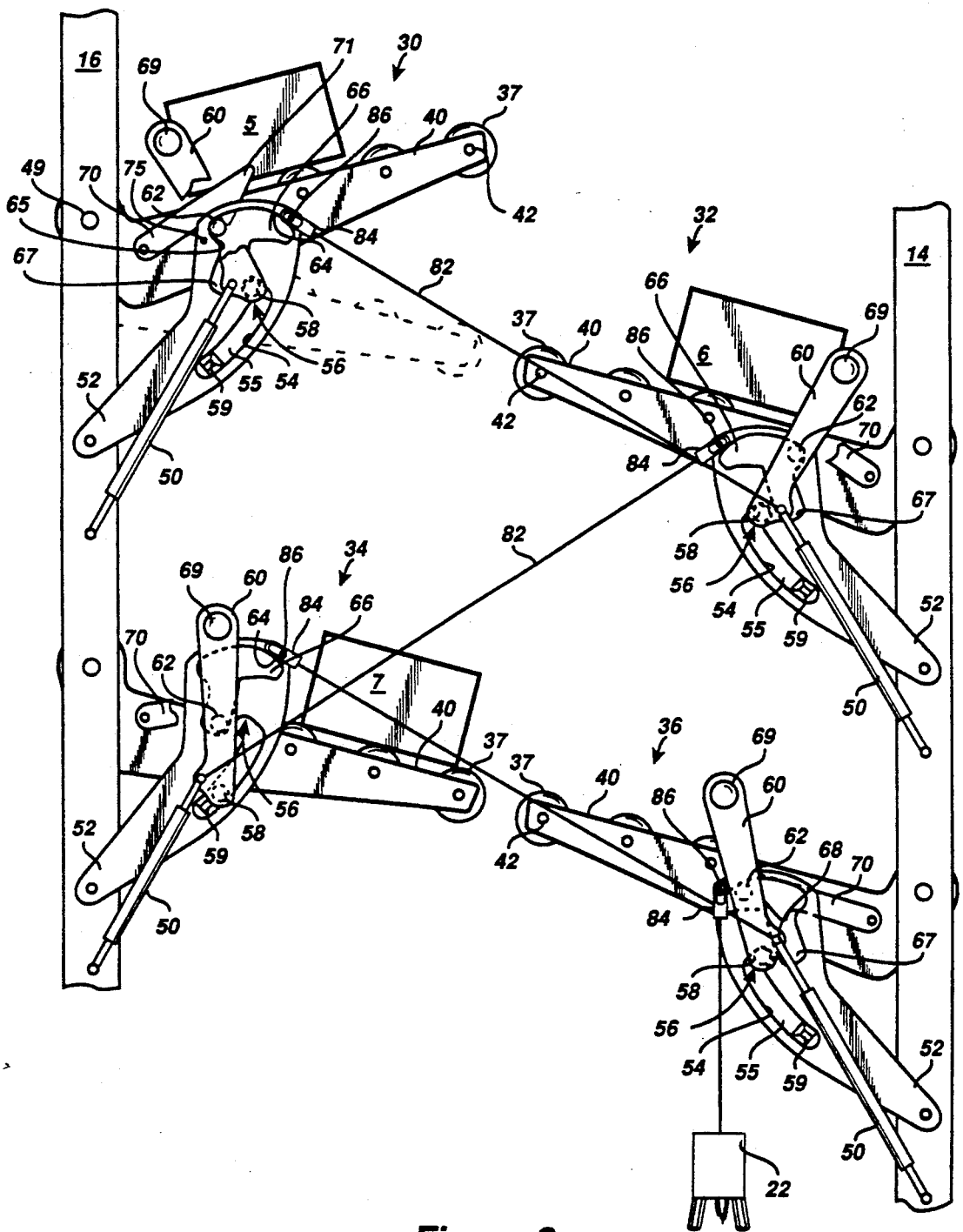
FIG. 3 is a side elevation view, similar to FIG. 2, and depicting a second mode of operation.

Each shelf assembly includes a shelf 40 for receiving, storing and discharging containers, and the shelves of the opposing stacks are vertically staggered relative to one another. Each shelf 40 is pivotally mounted relative to the support structure for movement between an upwardly tilted receiving position, illustrated by the shelf assemblies 30, 32 and 34, and a downwardly tilted discharge position, illustrated by the shelf assembly 36 (FIG. 1). The free ends 37 of the shelves of each stack extend toward the opposing stack. As illustrated in FIG. 3, the forward end 37 of a shelf assembly 34 in the downwardly tilted discharge position preferably aligns with the free end 37 of a next lower, opposing shelf 36 in the upwardly tilted receiving position to allow for the smooth transfer of the container 7 under the influence of gravity from the upper shelf to the next lower, opposing shelf.

Containers are introduced to the apparatus at or near the top of the stacks. A biased ramp 39 can be provided to receive containers at the top of the apparatus and pivot under the weight of containers to transfer the containers to the first, uppermost shelf assembly 30. The containers are transferred sequentially downward in a zigzag manner through the stacks, from one shelf to the next lower shelf, and each container descends through the stacks until it is disposed on the lowest unfilled shelf. The apparatus can include a fixed, upwardly tilted dispensing ramp 38 to dispense containers discharged from the lowest shelf assembly 36 to external structure, such as a conveyor belt (not shown).

The Preferred Shelf Assemblies

Figure 2:
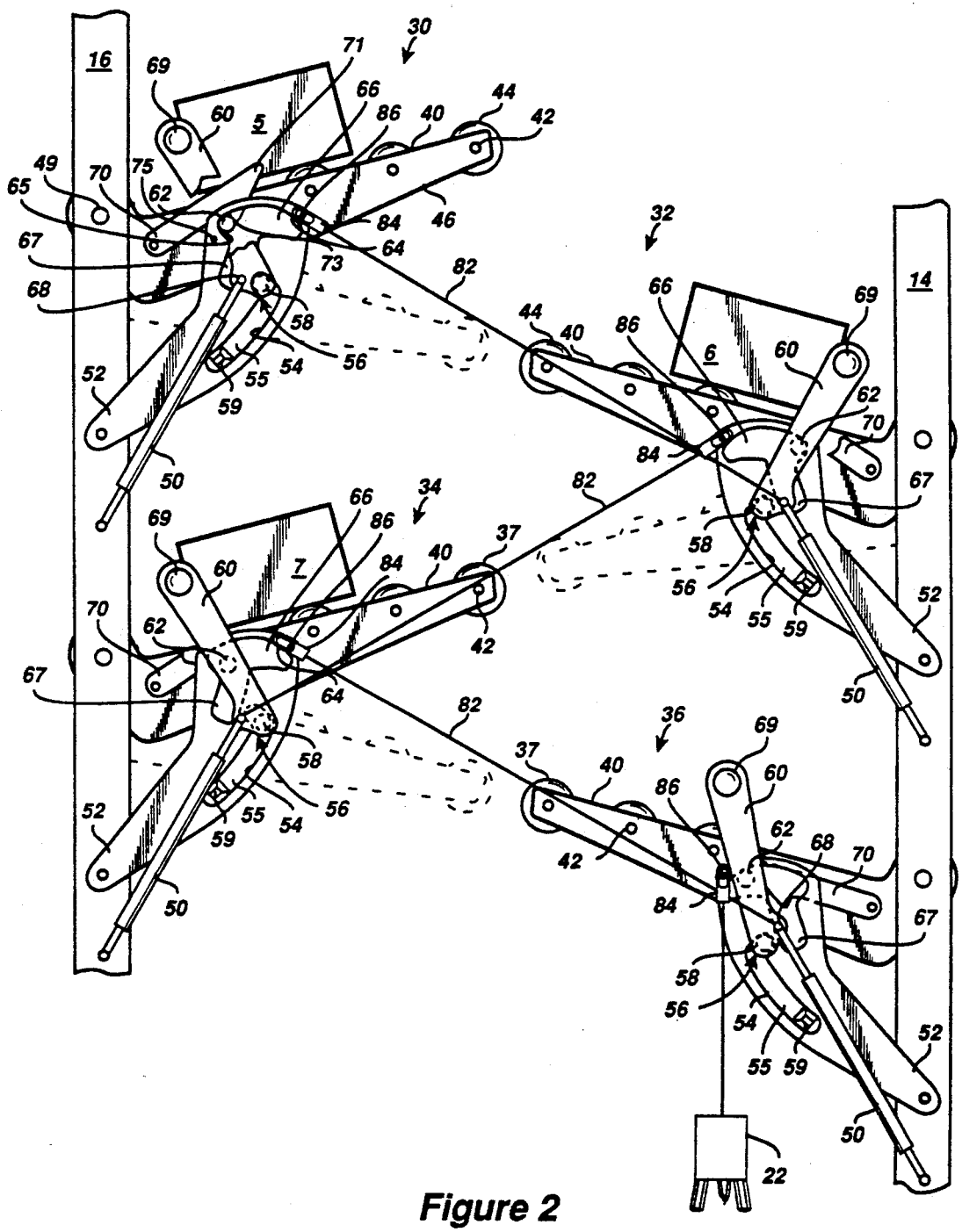
FIG. 2 is a side elevation view, partially broken away, depicting a first mode of operation.

Referring to FIG. 2, the uppermost shelf assembly 30 is representative of a preferred shelf assembly according to the invention.

The shelf assemblies 30, 32, 34 and 36 illustrate various modes of operation of the preferred shelf assembly and the associated position of the shelf assembly components. Accordingly, reference to particular shelf assemblies are made in connection with the particular mode of operation being discussed.

Each shelf 40 is pivotally attached to a vertical support structure, such as between the columns 14 and 16, for movement between an upwardly tilted receiving position, as shown, and a downwardly tilted discharge position, shown by shelf assembly 34 in FIG. 3. The receiving position also serves as a storing position for the container occupying the shelf 40 until the next lower shelf assembly 32 is prepared to receive the container 5. The tilt angles of the receiving and discharge positions relative to horizontal are preferably approximately 10 degrees, but can range between 5 and 20 degrees for suitable performance.

Figure 4:
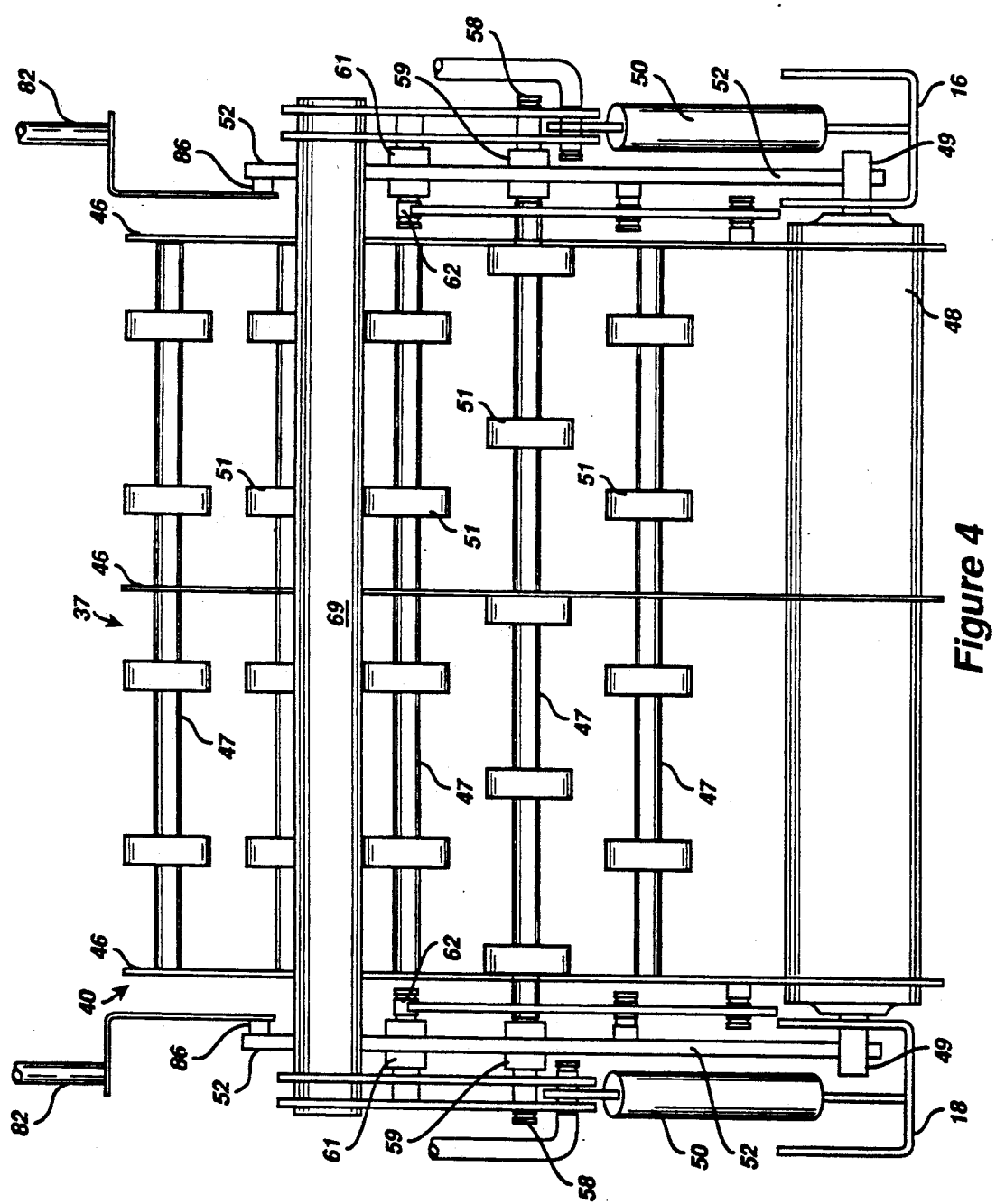
FIG. 4 is a top plan view of a shelf assembly according to the invention.

The shelf 40 can be formed by two or three shelf arms 46, which extend in parallel from the support structure to the free end 37 of the shelf 40 (FIG. 4). Cross members 47 are mounted between and transversely to the shelf arms 46, and can have a plurality of rollers 51 to assist movement of containers across the surface of the shelf 40. The shelf arms 46 can be attached to a mounting bar 48, which is pivotally mounted between the columns 16 and 18. The mounting bar 48 can include pins 49 which extend into aligned holes in the columns 16 and 18 thereby allowing the shelf 40 to pivot vertically relative to the support structure.

The shelf assembly includes biasing means, such as spring 50, for urging the shelf 40, when empty, upwardly to the receiving position. The spring rate of the preferred biasing means 50 is selected to provide the necessary upward movement of an empty shelf, but is also selected to yield under the additional weight of a container disposed on the shelf 40, to allow the shelf 40 pivot to the discharge position. As the shelf assembly 30 is preferably designed to accommodate a range of container weights, the biasing means 50 is preferably selected to operate within a desired range of weights, and not merely at a single weight value. The biasing means 50 is preferably an axial cylinder spring, as shown, mounted at its lower end to the support structure, and operatively connected to the shelf 40 at its upper end. Alternatively, the biasing means can be a switchable mechanism, such as a solenoid or pneumatic drive for driving the shelf 40 to the receiving position when the shelf is empty, but allowing descent when a container is present on the shelf 40.

The shelf assembly 30 also includes a transfer stop means for retaining the shelf 40 in the receiving position when a container is disposed on the next lower, opposing shelf 32, or when the shelf 32 is transitioning to or from the discharge position. The transfer stop means is moveable between a lock position and a release position. A transfer control means, which can be mechanical, electrical or pneumatic, controls the action of the transfer stop means according to status of the next lower, opposing shelf assembly 32. When the next lower shelf assembly 32 is prepared to receive a container, i.e. is empty and located in the receiving position, the transfer control means moves the transfer stop means of the upper shelf assembly 30 to the release position to allow the shelf 40 to pivot downwardly to discharge the container. When the next lower shelf assembly 32 is unprepared to receive a container, either because the shelf assembly 32 is occupied by a container or because the shelf assembly 32 is pivoting to or from the discharge position, the transfer stop means of the upper shelf assembly 30 remains in the lock position to retain the shelf 40 in the receiving position.

The transfer stop means preferably includes a post 58 extending from the shelf 40 through a slot in a plate 52 (FIG. 4). A roller sleeve 59 can be placed around the post 58 to provide smooth, rolling engagement between the post 58 and the slot of the plate 52 (FIG. 4). The plate 52 is preferably mounted below the shelf 40 to the column 16 and extends upwardly, adjacent the post 58. The plate 52 provides a slot surface 54 which defines a transfer channel 55 and a transfer stop notch 56. The post 58 moves within the channel 55 and notch 56.

When the shelf 40 of the shelf assembly 30 is in the receiving position (FIG. 2), the post 58 is positioned in the upper end of the transfer channel 55. The plate 52 pivots downwardly under its own weight to a lock position, thereby aligning the post 58 with the transfer stop notch 56. The shelf 40 cannot pivot downwardly because the position of the post 58 in the notch 56 prohibits movement of the post 58.

The shelf 40 is retained in the receiving position until the plate 52 moves to a release position. Shelf assembly 34 (FIG. 2) illustrates the plate 52 in the release position. Movement of the plate 52 aligns the post 58 with the transfer channel 55. The curved path of the transfer channel 55 preferably corresponds to the arcuate downward path of the post 58 during descent of the shelf 40. Thus, when the post 58 is aligned with the transfer channel 55, the post 58 and the shelf 40 to which the post 58 is connected will descend to the discharge position to transfer a container to the next lower shelf assembly 36 (FIG. 3).

The plate 52 is moved from the lock position to the release position by an appropriate transfer control means according to the receiving status of the next lower shelf assembly. The transfer control means is preferably mechanical and preferably includes a connecting rod 82 connected between the plate 52 and the next lower shelf assembly 32. The connecting rod 82 can be connected to the plate 52 through a slotted end member 84, disposed adjacent the plate 52 of upper shelf assembly 30. The end member 84 loosely surrounds a pin 86 attached to the face of the plate 52, and is adapted to slidingly and pivotally engage the pin 86 when urged by the connecting rod 82. The pin 86 is preferably mounted near the top of the plate 52 above the slot 64, but can be attached at various locations on the plate 52.

Upward movement of the shelf assembly 36 causes associated movement of the connecting rod 82. Engagement of the end member 84 with the pin 86 moves the plate 52 upwardly to the release position shown by shelf assembly 34. The transfer stop notch 56 is moved away from the post 58, which aligns with the channel 55. The post 58 and the associated shelf 40 of the shelf assembly 34 can descend to the discharge position to transfer the container 7 to the next lower shelf assembly 36 (FIG. 3).

The lower end of the connecting rod 82 can be connected to various parts of the next lower shelf assembly 32, but is preferably connected to an indicator arm 60. The indicator arm 60 is pivotally mounted to the shelf 40 for movement between a forward position toward the free end 37 of the shelf 40 and a rearward position, as shown, away from the free end 37. In the preferred embodiment, the indicator arm 60 of shelf assembly 32 is urged to the forward position by the biasing means 50 when the shelf assembly 32 is empty. When a container 6 is disposed on the shelf assembly 32, the container engages a cross bar 69 (FIG. 4) of the indicator arm 60, and moves the indicator arm 60 to the rearward position against the force of the biasing means 50. Thus, the position of the indicator arm 60 is dependent upon the presence of a container on the shelf assembly 32.

The connecting rod 82 communicates the position and the associated status of the next lower shelf assembly 32 to the plate 52 of the upper shelf assembly 30. When the next lower shelf assembly 32 is occupied by a container, the indicator arm 60 is retracted to the rearward position, and the connecting rod 82 does not urge the slotted end member 84 to engage the plate pin 86. Accordingly, the plate 52 of the shelf assembly 30 remains in the lock position.

Similarly, when the next lower shelf assembly 32 is transitioning to or from the discharge position, the plate 52 of the upper shelf assembly 30 should remain in the locked position. The connecting rod 82 and the end member 84 are preferably selected to move with the next lower shelf assembly 32 during transitioning to and from the discharge position without affecting the plate 52 of the upper shelf assembly 30.

Now referring to the lower shelf assemblies 34 and 36 in FIG. 2, the shelf assembly 36 is prepared to receive a new container, such as container 7, because the shelf assembly 36 is located in the receiving position and is empty. Accordingly, the indicator arm 60 is urged to the forward position by the biasing structure 50. As the indicator arm 60 is driven toward the forward position, the connecting rod 82 moves upwardly, thereby urging the slotted end member 84 to engage pin 86 of the shelf assembly 34. The plate 52 is moved to the release position shown, thereby allowing the tray to pivot to the discharge position to transfer a container (FIG. 3).

The preferred shelf assembly 30 also provides a receiving stop means for retaining the shelf 40 in the receiving position until a container being transferred from a next higher shelf assembly is completely disposed on the shelf surface. The receiving stop means prevents the shelf 40 from descending prematurely, which can cause the transferred container to topple o lodge between shelf assemblies.

The receiving stop means is preferably integrated into the plate 52. A receiving stop channel 67 is formed by a slot 64, which also defines a receiving stop recess 66. A receiving stop pin 62 extends from the indicator arm 60 through the slot 64 formed in the plate 52 (FIG. 4). The receiving stop pin 62 is preferably surrounded by a roller sleeve 61 for smooth, rolling engagement between the slot 64 and pin 62. The receiving stop recess 66 prohibits movement of the receiving stop pin 62. The receiving stop channel 67 preferably coincides with the downward arcuate path of the receiving stop pin 62 to permit the descent of the shelf 40 when the receiving stop pin 62 is aligned with the receiving stop channel 67.

Referring to the shelf assembly 36 in FIG. 2, when the shelf 40 is empty, the indicator arm 60 is driven to the forward position, toward the free end 37, by the biasing means 50. Correspondingly, the receiving stop pin 62 is positioned in the receiving stop recess 66 of the slot 64. The plate 52 blocks the downward arcuate path of the receiving stop pin 62 required for downward pivoting of the shelf 40.

As the indicator arm 60 pivots to the rearward position, the receiving stop pin 62 leaves the receiving stop recess 66 and aligns with the channel 67, which permits descent of the receiving stop pin 62 and the shelf 40. Thus, the receiving stop will retain the shelf 40 in the receiving position until a container is completely disposed on the shelf.

The transfer stop means and the receiving stop means are preferably provided integrally, such that the shelf 40 of shelf assembly 30 is retained in the receiving position until a container is fully received and further until the next lower shelf assembly 32 is prepared to receive a container. This is easily accomplished by providing the single plate 52 having both the transfer channel 55 and the receiving channel 67. Thus, the preferred shelf assembly provides a dual stop arrangement in which movement of a plate relative to a pin controls descent according to the readiness of a next lower shelf and the movement of a pin relative to the plate controls descent of the shelf according to the presence of a container on the shelf. This elegant assembly provides reliable coordinated operation of the shelf assembly with minimal structural components.

The preferred shelf assembly can also be adapted to provide a discharge drive means for overcoming friction between a stored container and the underlying shelf surface during transfer operations. The discharge drive means should include a driving member for imparting force on the container toward the free end of the shelf as the shelf pivots to the discharge position. The driving member preferably imparts a continuous force to the container during the descent of the shelf. However, an initial, impulsive force to the container can be sufficient to overcome static friction when the downward tilt angle of the shelf is selected to overcome the remaining kinetic friction between the container and the underlying shelf surface as the container is transferred.

In the preferred shelf assembly, the driving member is the indicator arm 60 and cross bar 69. Referring to FIG. 2, the indicator arm 60 of shelf assembly 34 is positioned relative to the plate 52 to permit descent of shelf 40. As the shelf 40 and the indicator arm 60 descend, the biasing means 50 urges the indicator arm 60 forward towards the free end 37 of shelf 40. The forward rotation of the indicator arm drives the container 7 towards the free end, thereby overcoming static friction between the container 7 and the underlying surface of shelf 40. Thus, the components of the preferred shelf assembly can not only control the position of the shelf but can also simultaneously serve to overcome the static friction between a stored container and the underlying surface during the transfer operations without increasing the downward tilt angle of the shelf in the discharge position. When the receiving stop means is in the releasing rearward position but the transfer stop means is in the lock position, the receiving stop pin 62 should be secured in the full rearward position to avoid false signals to the next high shelf assembly.

As discussed above, the connecting rod 82 controls the transfer stop means of shelf assembly 30 according to the location of the indicator arm 60 of the next lower shelf assembly 32. A forward position of the indicator arm 60 indicates the shelf 40 is empty, and a rearward position of the indicator arm 60 indicates that a container is occupying the shelf 40. Accordingly, the indicator arm 60 of the next lower shelf assembly 32 should be accurately positioned to adequately represent the presence or absence of a container on the shelf 40. Positions of the indicator arm 60 between the forward and rearward locations can create ambiguous signals to the connecting rod 82, causing the connecting rod 82 to prematurely activate the transfer stop means of the upper shelf assembly 30 or to fail to release the upper shelf assembly 30.

The initial impact of a received container with the cross bar 69 drives the indicator arm 60 to the rearward position. If the forward force exerted by the biasing structure 50 is greater than the weight component applied to the indicator arm 60 by the container, the indicator arm 60 can settle at an intermediate position between the forward and rearward positions. Each shelf assembly therefore preferably provides a latch 70 to secure the receiving stop pin 62 and the indicator arm 60 in the rearward position upon receipt of a container. Referring to the shelf assembly 30, the latch 70 is preferably pivotally mounted to the shelf 40 and extends toward the free end 37. A free end 71 of the latch 70 provides a sloped surface for engaging the receiving stop pin 62. As the receiving stop pin 62 moves rearwardly, the sloped surface raises the latch 70.

In the shelf assembly 30, the indicator arm 60 has been partially broken away to illustrate the interaction of the latch 70 with the receiving stop pin 62. When the receiving stop pin 62 reaches a latch corner 65, located at the upper end of the channel 67, the latch 70 pivots downwardly under its own weight and secures the receiving stop pin 62 in the latch corner 65 by a shoulder 73. When the shelf 40 and associated receiving stop pin 62 descend to the discharge position, the latch 70 is preferably prevented from following by a retaining pin 75 extending from the face of the plate 52. In the shelf assemblies 32 and 34, the latch 70 has been partially removed so as not to interfere with the clarity of the surrounding structure for illustration and explanation purposes.

Operation

Referring to FIG. 1, a container, such as container 9, can be selectively dispensed from the storing and dispensing apparatus by release of the lowermost shelf assembly 36. A solenoid 22 can be provided to move the plate 52 to the release position, thereby permitting the descent of shelf 40 to the discharge position. The container 9 is transferred from the shelf assembly 36 to the dispensing ramp 38 for delivery to external structure, such as a conveyor belt.

Referring to FIG. 2, when the container 9 has been discharged, the shelf 40 of shelf assembly 36 is urged to the receiving position by a biasing means 50. When the post 58 reaches the upper portion of channel 55, the plate 52 moves downwardly to secure the post 58 and the transfer stop notch 56. Simultaneously, the indicator arm 60 is rotated forward by the biasing structure 50 to the forward position toward the free end 37. Thus, the shelf assembly 36 is configured to receive a container as it is in the receiving position and is empty. The forward position of the indicator arm 60 in relation to the upwardly tilted receiving position of the shelf 40 moves the connecting rod 82 and the end member 84 into sliding engagement with the pin 86 on plate 52 of the upper shelf assembly 34. The plate 52 is thereby moved to the release position, aligning the post 58 with the transfer channel 55. As the shelf assembly 34 is presently occupied by a container 7, the indicator arm 60 is in the rearward position, thereby aligning the receiving stop pin with the receiving stop channel 67. Thus, the post 58 and the receiving stop pin 62 are aligned in their respective channels 5 and 67 to permit the downward pivot of the shelf 40.

Referring to FIG. 3, the shelf 40 of shelf assembly 34 pivots downwardly to the discharge position to transfer container 7 to shelf assembly 36. During the descent, the indicator arm 60 is pivoted forwardly by the biasing structure 50 to drive the container 7 towards the free end 37 of shelf 40. This forward drive overcomes static friction between the container 7 and the surface of shelf 40 to provide smooth transfer of the container 7 to shelf assembly 36.

The above-described transfer operation continues sequentially between shelf assemblies 32 and 34 and shelf assemblies 30 and 32 until containers are transferred to the lowest unfilled shelf.

Thus, the preferred storage and dispensing apparatus includes shelf assemblies for selectively dispensing and automatically advancing containers through the shelf assembly stack with shelves having only an upwardly tilted receiving and storage position and a downwardly tilted discharge position.

Although the components of such preferred shelf assemblies have been described in detail, many of the components can have electrical or pneumatic equivalents known to those of ordinary skill in the art. Additionally, alternative constructions and assemblies will now be apparent to those of ordinary skill in the art. For example, referring to FIG. 4, the shelf assembly can include similar structure on both sides of the shelf 40, although the preferred embodiment provides the receiving stop means, transfer stop means and transfer indicator means only on one side. For larger container weights, perhaps one hundred pounds, it may be desirable to provide similar assembly structure on both sides of the shelf 40 to increase lateral stability of the shelf. Accordingly, the scope of the invention should not be limited by the foregoing description but only by a reasonable interpretation of the following claims.

I claim:

1. A storage and dispensing apparatus for articles, containers and the like comprising:
   a first plurality of substantially vertically spaced shelf assemblies supported by support structure; and
   a second plurality of substantially vertically spaced shelf assemblies supported by support structure;
   each of said shelf assemblies comprising:
   a shelf for receiving, storing and discharging containers, the shelves of the first plurality of shelf assemblies being substantially staggered vertically relative to the shelves of the second plurality of shelf assemblies, with free ends of each plurality facing the free ends of the other plurality, each shelf being mounted to its respective vertical support for pivotal movement between an upwardly tilted receiving position and a downwardly tilted discharge position;
   biasing structure adapted to urge the shelf to the receiving position;
   a transfer stop operatively connected to the shelf and moveable between a lock position retaining the shelf in the receiving position when a shelf of a next lower shelf assembly is not prepared to receive a container and a release position allowing the shelf to move to the discharge position under weight of a container disposed on said shelf when the shelf of the next lower shelf assembly is prepared to receive a container; and
   a transfer control operatively connected between the transfer stop and the next lower shelf assembly for releasing the transfer stop when the next lower shelf is prepared to receive a container.

2. The apparatus according to claim 1, wherein the next lower shelf assembly is prepared to receive a container when the shelf of the next lower shelf assembly is located in an upwardly tilted receiving position and is empty.

3. The apparatus according to claim 2, wherein the transfer stop includes a post, extending laterally from the shelf, and a plate pivotally mounted below the shelf relative to the support structure and extending upwardly adjacent to the post, said plate having a transfer channel adapted to receive the post, said transfer channel allowing downward motion of the post and the shelf, and a transfer stop notch for preventing the downward motion of the post and the shelf, said post being located in the transfer stop notch when the shelf is located in the receiving position and the plate is located in a lock position and said post aligning with the channel when the plate is moved from the lock position to a release position by the transfer control.

4. The apparatus according to claim 3, wherein the plate moves to the lock position under its own weight.

5. The apparatus according to claim 3, wherein the transfer control includes a connecting rod operatively connected to the next lower shelf assembly and terminating in an end member adjacent the plate, said end member surrounding a pin extending from the plate, the connecting rod and the end member being urged upwardly and engaging the pin to urge the plate to the release position when the shelf of next lower shelf assembly is prepared to receive a container.

6. The apparatus according to claim 1, further comprising a receiving stop connected to the shelf and moveable between a first position for retaining the shelf in the receiving position when the shelf is empty and a second position for allowing the shelf to move to the discharge position under weight of a container disposed on said shelf when the container is completely disposed on the shelf.

7. The apparatus according to claim 6, wherein the receiving stop includes:
 an indicator arm pivotally connected to the shelf for movement between the first position and the second position, said indicator arm provided with a receiving stop pin;
 a plate mounted below the shelf relative to the support structure and extending upwardly adjacent to the receiving stop pin, said plate providing a slot for receiving the receiving stop pin, said slot having a receiving stop recess for preventing downward motion of the receiving stop pin and the shelf, and a channel for allowing the downward motion of the receiving stop pin and the shelf, the receiving stop pin being located in the receiving stop recess when the indicator arm is located in the first position and the receiving stop pin aligning with the channel when the indicator arm is located in the second position.

8. The apparatus according to claim 7, wherein the receiving stop further includes a latch pivotally connected to the shelf for securing the receiving stop pin in a latch corner of the slot when the indicator arm is located in the second position.

9. The apparatus according to claim 8, wherein the receiving stop further includes a cross bar extending above the shelf transversely from the indicator arm, said indicator arm being moved to the second position by a container impacting the cross bar.

10. The apparatus according to claim 1, wherein the shelf includes rollers arranged to rollingly support a container on the shelf.

11. The apparatus according to claim 1, wherein the vertical support includes a plurality of vertical columns.

12. The apparatus according to claim 11, wherein the vertical columns are connected by cross members to form a tower.

13. The apparatus according to claim 7, wherein the biasing structure is an axial spring connected to the support structure and operationally connecting to the shelf.

14. The apparatus according to claim 13, wherein the axial spring is connected to the indicator ar for urging the indicator arm to the first position.

15. The apparatus according to claim 1, wherein a shelf of a next lower shelf assembly located in the receiving position aligns with a shelf of a next higher shelf assembly located in the discharge position for providing a substantially planar transfer surface for a container transferred from the shelf of the next higher shelf assembly to the shelf of the next lower shelf assembly.

16. A vertically accumulating storage and dispensing apparatus for containers and the like comprising:
 a first plurality of vertically spaced shelf assemblies supported by support structure; and
 a second plurality of vertically spaced shelf assemblies supported by a support structure and opposing the first plurality of shelf assemblies;
 each of said shelf assemblies comprising:
 a shelf, the shelves of each series of shelf assemblies being staggered vertically relative to the shelves of the opposing series of shelf assemblies, each shelf being mounted to its respective vertical support for pivotal movement between an upwardly tilted, receiving position and a downwardly tilted, discharge position;
 biasing structure for urging the shelf to the receiving position;
 a post extending laterally from the shelf;
 a plate pivotally mounted relative to the support structure and extending adjacent to the post, said plate providing a slot for receiving the post, said slot having a channel for allowing downward motion of the post and the shelf and a retaining notch for preventing the downward motion of the post and the shelf, said post being located in the retaining notch when the shelf is located in the receiving position and the plate is located in a lock position and said post aligning with the channel when the plate is moved from the lock position to a release position for allowing the shelf to move to the discharge position under weight of a container disposed on said shelf when a shelf of a next lower shelf assembly is prepared to receive a container;
 a connecting rod connected to the next lower shelf assembly and terminating in an end member adjacent the plate, said end member surrounding a pin extending from the plate, the connecting rod and end member being urged upwardly and engaging the pin to urge the plate to the release position when the shelf of next lower shelf assembly is prepared to receive a container;
 an indicator arm pivotally connected to the shelf for movement between a forward position toward said forward end of the shelf for retaining the shelf in the receiving position when the shelf is empty and a rearward position away from said forward end for allowing the shelf to move to the discharge position when the container is completely disposed on the shelf, said indicator arm provided with a receiving, said plate providing an aperture for receiving the receiving stop pin, said aperture having a stop recess for preventing downward motion of the receiving stop pin and the shelf, and a descent channel for allowing the downward motion of the receiving stop pin and the shelf, the receiving stop pin being located in the stop recess when the indicator arm is located in the forward position and the receiving stop pin aligning with the descent channel when the indicator arm is located in the rearward position.

17. The apparatus of claim 16, wherein the next lower shelf assembly is prepared to receive a container when the shelf of the next lower shelf assembly is located in an upwardly tilted receiving position and is empty.

18. The apparatus of claim 16, wherein the connecting rod is connected to an indicator arm of the next lower shelf assembly so that the connecting rod is urged upwardly when the indicator arm of the next lower shelf assembly moves to a forward position.

19. The apparatus according to claim 18, wherein an axial spring is connected to the indicator arm of each shelf for urging the indicator arm to the forward position.

20. The apparatus of claim 19, wherein the connecting rod connects to the indicator arm of the next lower shelf assembly on a junction pin to which an axial spring of the next lower shelf assembly is attached.

21. The apparatus according to claim 16, wherein the shelf of the next lower shelf assembly when located in the receiving position aligns with the shelf when located in the discharge position for providing a substantially planar transfer surface for a container transferred from the shelf to the shelf of the next lower shelf assembly.

22. The apparatus according to claim 16, wherein each shelf assembly includes a latch pivotally connected to the shelf for securing the receiving stop pin in a latch corner of the aperture when the indicator arm is located in the rearward position.

23. The apparatus according to claim 16, wherein each shelf assembly includes a cross bar extending above the shelf transversely from the indicator arm, said latch arm being moved to the rearward position by a container impacting the cross bar.

24. The apparatus according to claim 16, wherein the shelf includes wheels arranged to rollingly support a container on the shelf.

25. The apparatus according to claim 16, wherein the first and second vertical supports include a plurality of vertical columns.

26. The apparatus according to claim 26, wherein the vertical columns are connected by cross members to form a tower.

27. A storage and dispensing apparatus for articles, containers and the like comprising:
a first plurality of substantially vertically spaced shelf assemblies supported by support structure; and
a second plurality of substantially vertically spaced shelf assemblies supported by support structure;
each of said shelf assemblies comprising:
a shelf for receiving, storing and discharging containers, the shelves of the first plurality of shelf assemblies being substantially staggered vertically relative to the shelves of the second plurality of shelf assemblies, with free ends of each plurality facing the free ends of the other plurality, each shelf being mounted to its respective vertical support for pivotal movement between an upwardly tilted receiving position and a downwardly tilted discharge position;
biasing means adapted to urge the shelf to the receiving position;
a transfer stop means connected to the shelf and moveable between a lock position retaining the shelf in the receiving position when a shelf of a next lower shelf assembly is not prepared to receive a container and a release position allowing the shelf to move to the discharge position under weight of a container disposed on said shelf when the shelf of the next lower shelf assembly is prepared to receive a container; and
a transfer control means operatively connected between the transfer stop means and the next lower shelf assembly for releasing the transfer stop means when the next lower shelf is prepared to receive a container.

28. The apparatus according to claim 27, further comprising a receiving stop means connected to the shelf and moveable between a first position for retaining the shelf in the receiving position when the shelf is empty and a second position for allowing the shelf to move to the discharge position under weight of a container disposed o said shelf when the container is completely disposed on the shelf.

29. A storage and dispensing apparatus for articles, containers and the like comprising:
a first plurality of substantially vertically spaced shelf assemblies supported by support structure; and
a second plurality of substantially vertically spaced shelf assemblies supported by support structure;
each of said shelf assemblies comprising:
a shelf for receiving, storing and discharging containers, the shelves of the first plurality of shelf assemblies being substantially staggered vertically relative to the shelves of the second plurality of shelf assemblies, with free ends of each plurality facing the free ends of the other plurality, each shelf assembly being mounted to its respective vertical support for pivotal movement;
an arm pivotally connected to the shelf for movement between a first position toward said free end and a second position away from said free end;
biasing means adapted to urge the shelf upwardly and to urge the arm to the first position; and
a cross bar extending from said arm above said shelf for engaging a container located on said shelf, wherein said biasing means urges said arm and cross member toward said first position when said shelf pivots downwardly to urge said container off said shelf.

* * * * *

UNITED STATES PATENT AND TRADEMARK OFFICE
CERTIFICATE OF CORRECTION

PATENT NO. : 5,111,963
DATED : May 12, 1992
INVENTOR(S) : ROBERT W. GRACE, SR.

It is certified that error appears in the above-identified patent and that said Letters Patent is hereby corrected as shown below:

```
Column 5, line 1, after "container", insert --5--.
Column 7, line 31, replace "o" with --or--.
Column 9, line 56, replace "5" with --55--.

Column 12, line 4, replace "ar" with --arm--.
           line 62, after "receiving", insert --stop pin--.
Column 13, line 37, replace "latch" with --indicator--.
           line 45, replace "26" with --25--.
Column 14, line 29, replace "o" with --on--.
```

Signed and Sealed this

Nineteenth Day of October, 1993

Attest:

BRUCE LEHMAN

*Attesting Officer*     *Commissioner of Patents and Trademarks*